United States Patent Office 2,901,319
Patented Aug. 25, 1959

2,901,319

PREPARATION OF POTASSIUM MONOPERSULFATE

Alfred A. D'Addieco, Grand Island, N.Y., assignor to E. I. du Pont de Nemours and Company, Wilmington, Del., a corporation of Delaware No Drawing. Application October 31, 1957
Serial No. 693,554

8 Claims. (Cl. 23—114)

This invention relates to the preparation of relatively pure potassium monopersulfate.

Potassium monopersulfate, $KHSO_5$, has recently been found to be an outstanding bleaching agent for various purposes, particularly for use in home laundry bleaching compositions and in scouring powders. Most prior methods for preparing potassium monopersulfate yield relatively impure products or require tedious and costly fractional crystallization and evaporation procedures.

One long-known method (Mellor, A Comprehensive Treatise on Inorganic and Theoretical Chemistry, vol. X, pages 482–483 (1930)) involves reacting potassium dipersulfate ($K_2S_2O_8$), commonly called potassium persulfate, with an excess of concentrated sulfuric acid, neutralizing the mixture with aqueous $K_2CO_3$ equal to the sulfuric acid used, filtering off the separated $K_2SO_4$, neutralizing the acidic filtrate with anhydrous $K_2CO_3$, filtering off the separated $K_2SO_4$ and evaporating the filtrate to dryness. Although $K_2SO_4$ which continually separates during the evaporation is filtered off from time to time, the final dry product is still impure.

A more recent method for obtaining potassium monopersulfate products is that of Stephanou (U.S. Patent 2,802,722) wherein aqueous monopersulfuric acid and potassium carbonate or hydroxide are reacted in such proportions that the pH of the resulting mixture does not exceed 3. The mixture is then filtered and evaporated, or evaporated directly, to yield product containing from around 5 to 7.7% active oxygen (theoretical for $KHSO_5$ is 10.5%). Although practical, this method has the disadvantage of yielding product of relatively low active oxygen content.

It is an object of the invention to provide a method of preparing a potassium monopersulfate product of relatively high active oxygen content (at least 8.9%, corresponding to at least 85% $KHSO_5$). A further object is to provide a method whereby such product is precipitated directly from a reaction mixture resulting from the reaction of potassium carbonate, bicarbonate or hydroxide with concentrated monopersulfuric acid containing sulfuric acid at a substantial concentration. Further objects will be apparent from the following description.

Monopersulfuric acid ($H_2SO_5$) is most generally prepared by the hydrolysis of dipersulfuric acid ($H_2S_2O_8$), generally called persulfuric acid, obtained by electrolytic methods, or by the reaction of concentrated hydrogen peroxide with concentrated sulfuric acid or oleum. The usual presence of substantial amounts of sulfuric acid in monopersulfuric acid made by such methods complicates the preparation of high purity potassium monopersulfate from such monopersulfuric acid. In contrast with prior methods for preparing potassium monopersulfate products, high purity monopersulfate (at least 8.9% active oxygen) can be readily obtained by the present method by direct precipitation from reaction mixtures employing a concentrated monopersulfuric acid reactant containing sulfuric acid at a substantial concentration, whether or not such monopersulfuric acid be obtained by the methods indicated above.

The objects of the invention are realized by reacting a concentrated monopersulfuric acid solution (at least 25% $H_2SO_5$) containing sulfuric acid at a substantial concentration, with an amount of solid potassium carbonate, bicarbonate or hydroxide, or of a concentrated solution of potassium carbonate or hydroxide, which will precipitate directly from the resulting mixture a product having an active oxygen content of at least 8.9%. The reaction should be carried out at a temperature which is not sufficiently high to cause excessive loss of active oxygen. In general, the temperature should not exceed about 40° C. and may be as low as about $-10°$ C. The preferred temperatures range from about $-5$ to $+30°$ C.

The potassium carbonate, bicarbonate or hydroxide reactant can be employed as a solid. Preferably, the potassium compound reactant will be a solution of the carbonate or hydroxide. When such a solution is used its concentrations, and also the concentration of monopersulfuric acid in the monopersulfuric acid reactant solution, should be sufficiently high to result in the precipitation of potassium monopersulfate in the reaction mixture. The solution of the potassium carbonate or hydroxide generally will contain from about 30% up to the saturation concentration of the potassium compound, a concentration of at least 40% of the weight of the solution being preferred. The monopersulfuric solution employed usually will contain at least 25%, e.g., from 25 to 90%, $H_2SO_5$ by weight, a concentration of at least 50% being generally preferred. Obviously, if highly concentrated monopersulfuric acid solution is used, precipitation of potassium monopersulfate is possible even when using relatively dilute solutions of the potassium carbonate or hydroxide. Conversely, direct precipitation of the monopersulfate can be achieved employing the potassium compound reactant as a solid or as a highly concentrated solution of potassium carbonate or hydroxide and a relatively dilute solution of monopersulfuric acid. However, since the yield of precipitated monopersulfate product generally increases as the concentrations of the reactant solutions are increased, the use of highly concentrated reactant solutions is preferred.

Purity of the precipitated product will depend upon the mole ratio of $H_2SO_5:H_2SO_4$ in the monopersulfuric acid solution reactant and also upon the proportions of the reactants employed. In general, the greater the mole ratio of $H_2SO_5:H_2SO_4$ in the monopersulfuric acid solution reactant, the purer will be the product. Also, if the mole ratio of $K^+$ (supplied as $K_2CO_3$, $KHCO_3$ or $KOH$) to $H_2SO_5$ greatly exceeds 1, the precipitated product will not be of high purity. Generally, the mole ratio of $H_2SO_5:H_2SO_4$ in the monopersulfuric acid solution will range from about 2 to 10. Ratios of 3 to 8 are preferred. The mole ratio of $K^+:H_2SO_5$ will depend somewhat upon the mole ratio of $H_2SO_5:H_2SO_4$. When the latter is lower than 3, the mole of ratio of $K^+:H_2SO_5$ generally should not exceed about 1, but this ratio may be as high as 1.2 when the $H_2SO_5:H_2SO_4$ ratio is 3 or higher. Mole ratios of $K^+:H_2SO_5$ lower than 1, e.g., as low as 0.6 can be used but result in lower yields of the desired product. It is generally preferred to employ the reactants in proportions corresponding to a $K^+:H_2SO_5$ mole ratio of 0.8 to 1.1, unless the mole ratio of $H_2SO_5:H_2SO_4$ is less than 3 in which case the mole ratio of $K^+:H_2SO_5$ should not exceed 1.

The invention is illustrated by the following examples in which all concentration percentages are by weight.

*Example 1*

A 200 g. portion of a monopersulfuric acid solution (prepared by the reaction of 70% $H_2O_2$ with 65% oleum)

was placed in a reaction flask equipped with a stirrer, a thermometer and a dropping funnel. The solution contained 1.16 moles $H_2SO_5$, 0.302 mole $H_2SO_4$, 0.30 mole $H_2O_2$ and 1.55 moles $H_2O$. While stirring and maintaining the contents of the flask at 0 to 10° C. (by means of a cold temperature bath), there was added to the flask dropwise over a period of 30 minutes 160 g. of a 50% $K_2CO_3$ solution (1.16 moles K+). The precipitate which formed was filtered from the reaction mixture at 5 to 7° C. Mother liquor was removed from the filter cake by washing with 100 ml. of a mixture of 75 ml. of ethanol and 25 ml. of water. The cake was then slurried with about 200 ml. of ethanol, filtered, reslurried with another 200 ml. ethanol and again filtered. The resulting product, after drying under reduced pressure (0.5–1 mm. Hg) at room temperature for 16 hours, weighed 102 g. and analyzed 93.7% $KHSO_5$ (9.84% active oxygen). The yield based on 1.16 moles $H_2SO_5$ charged was 54%.

Other preparations of potassium monopersulfate products were carried out following generally the procedure of Example 1 except that varying proportions of $$H_2SO_5:H_2SO_4$$

and of K+:$H_2SO_5$ were evaluated. The results are tabulated below.

again filtered, after which the product was dried in a vacuum desiccator over calcium chloride. The product had an active oxygen content of 9.31% (88.4% $KHSO_5$).

In carrying out the reaction between the monopersulfuric acid and the potassium carbonate or hydroxide, the latter should be added to the former, rather than the reverse, so that the reaction mixture will always be acidic. Alternatively, the two reactants can be added separately and simultaneously at suitable controlled rates to an agitated heel of a prior reaction mixture. In such a case, the method can be operated continuously by continuously withdrawing reaction mixture from the reaction vessel at a rate corresponding to the rates of addition of materials thereto, all rates being regulated so as to provide the desired residence time in the reactor. Another way of operating continuously is to feed the two reactant solutions at suitably controlled rates into a crooked tube reactor wherein they become rapidly mixed and reacted. The reactor tube would be cooled as required and would be of such a length that reaction is completed during passage of the reaction mixture through the tube.

The invention provides a highly practical method well-suited for either batchwise or continuous preparation of high purity product, wherein such product is precipitated directly from the reaction mixture.

| Ex. | Monopersulfuric Acid Solution Used (Moles Present) | | | | Mole Ratios | | Product | | |
|---|---|---|---|---|---|---|---|---|---|
| | $H_2SO_5$ | $H_2SO_4$ | $H_2O_2$ | $H_2O$ | $\frac{H_2SO_5}{H_2SO_4}$ | $\frac{K+}{H_2SO_5}$ | Percent Act. O | Percent $KHSO_5$ | Percent Yield [1] |
| 2 | 1.05 | 0.572 | 0.108 | 1.08 | 1.84 | 0.60 | 7.08 | 67.4 | 22 |
| 3 | 1.05 | 0.572 | 0.108 | 1.08 | 1.84 | 1.00 | 6.22 | 59.1 | 34 |
| 4 | 1.11 | 0.370 | 0.335 | 1.42 | 3.00 | 0.988 | 9.40 | 89.4 | 55 |
| 5 | 1.11 | 0.348 | 0.312 | 1.57 | 3.19 | 0.981 | 9.65 | 91.7 | 54 |
| 6 | 1.11 | 0.348 | 0.312 | 1.57 | 3.19 | 0.981 | 10.0 | 95.0 | 54 |
| 7 | 1.06 | 0.338 | 0.572 | 1.59 | 3.15 | 0.988 | 9.53 | 90.5 | 54 |
| 8 | 1.16 | 0.302 | 0.300 | 1.56 | 3.84 | 0.90 | 10.1 | 96.0 | 52 |
| 9 | 1.16 | 0.302 | 0.300 | 1.56 | 3.84 | 1.10 | 10.1 | 96.0 | 47 |
| 10 | 0.935 | 0.460 | 0.435 | 1.85 | 2.03 | 0.985 | 8.98 | 85.4 | 43 |
| 11 | 0.752 | 0.588 | 0.589 | 2.04 | 1.28 | 1.12 | 6.40 | 60.8 | 30 |
| 12 | 1.33 | 0.282 | 0.258 | 0.65 | 4.72 | 1.0 | 9.45 | 90.0 | 42 |
| 13 | 1.43 | 0.171 | 0.258 | 0.64 | 8.46 | 1.0 | 9.65 | 92.0 | 56 |

[1] Representing percent active oxygen recovered, based on $H_2SO_5$ charged.

The products of Examples 1–13 contained about equal parts by weight of $KHSO_4$ and $K_2SO_4$, in addition to the amounts of $KHSO_5$ shown above.

It is apparent from the above data that product purity usually increases as the mole ratio of $H_2SO_5:H_2SO_4$ is increased and that generally such mole ratio should be at least 2 in order to obtain product containing at least 8.9% active oxygen. $H_2SO_5:H_2SO_4$ mole ratios of at least 3 are distinctly preferred.

Upon separating the precipitated product, e.g., by filtering or centrifuging, it should be washed to remove mother liquor which contains the sulfuric acid originally present in the monopersulfuric acid used. Washing with water, ethanol or aqueous ethanol is generally satisfactory. Since potassium monopersulfate is readily soluble, washing for this purpose is preferably carried out rapidly and at low temperature, e.g., not higher than 15° C.

*Example 14*

A 300 g. portion of monopersulfuric acid solution was placed in a cooled reaction vessel provided with a stirrer and a 50% $K_2CO_3$ solution containing 1.7 moles K+ was added gradually thereto while the mixture was maintained at 0 to 10° C. The monopersulfuric acid solution used contained 1.7 moles $H_2SO_5$ about 0.6 mole $H_2SO_4$ and 0.35 mole $H_2O_2$. The resulting clear mixture was cooled and seeded with pure $KHSO_5$ whereupon a precipitate formed almost instantly. The precipitate was filtered out and the filter cake was slurried with 250 ml. cold ethanol. The slurry was filtered, the resulting cake was reslurried with cold ethanol and the mixture was

I claim:
1. The method of preparing a potassium monopersulfate product containing at least 8.9% active oxygen comprising reacting a monopersulfuric acid solution containing at least 25% $H_2SO_5$ and an amount of sulfuric acid such that the mole ratio of $H_2SO_5:H_2SO_4$ is in the range 2 to 10, with an amount of a potassium compound of the group consisting of the carbonate, bicarbonate and hydroxide which will precipitate directly a potassium monopersulfate product having an active oxygen content of at least 8.9% and separating said product from the resulting mixture.

2. The method of claim 1 wherein the reaction is carried out at a temperature not exceeding 40° C.

3. The method of claim 2 employing a monopersulfuric acid solution containing 25 to 90% $H_2SO_5$.

4. The method of claim 2 employing monopersulfuric acid solution containing at least 50% $H_2SO_5$.

5. The method of preparing a potassium monopersulfate product containing at least 8.9% active oxygen comprising reacting at a temperature not exceeding 40° C. a monopersulfuric acid solution containing 25 to 90% $H_2SO_5$ and an amount of sulfuric acid such that the mole ratio $H_2SO_5:H_2SO_4$ is in the range 3 to 8, with a solution containing at least 30% of a potassium compound from the group consisting of potassium carbonate and hydroxide, said solutions being employed in such proportions as to correspond to a mole ratio of K+:$H_2SO_5$ in the range 0.6 to 1.2, whereby a potassium monopersulfate product containing at least 8.9% active oxygen is precipitated, and separating the precipitated product from the reaction mixture.

6. The method of claim 5 employing a monopersulfuric acid solution containing at least 50% $H_2SO_5$ and a solution of the potassium compound containing at least 40% of said compound.

7. The method of claim 5 employing potassium carbonate.

8. The method of claim 6 employing potassium carbonate.

References Cited in the file of this patent

UNITED STATES PATENTS 2,802,722     Stephanou  ---------- Aug. 13, 1957